United States Patent [19]

Clarke et al.

[11] 4,202,677
[45] May 13, 1980

[54] FILTER BAG WITH REMOVABLE SHAPING MEMBERS

[75] Inventors: Ralph H. Clarke; W. James Clarke; Steven L. Mays, all of Eugene, Oreg.

[73] Assignee: Clarke's Sheet Metal, Inc., Eugene, Oreg.

[21] Appl. No.: 931,465

[22] Filed: Aug. 7, 1978

Related U.S. Application Data

[63] Continuation-in-part of Ser. No. 809,113, Jun. 22, 1977, abandoned.

[51] Int. Cl.² .................................................. B01D 46/02
[52] U.S. Cl. ............................................. 55/378; 55/381
[58] Field of Search .................................. 55/374–378, 55/381, 341 R, 341 NT; 210/497 R; 24/115 H, 115 K

[56] References Cited

U.S. PATENT DOCUMENTS

| | | | |
|---|---|---|---|
| 1,553,076 | 9/1925 | Halsted | 55/381 X |
| 1,586,868 | 6/1926 | Webb | 55/382 |
| 2,193,778 | 3/1940 | Rabatin | 55/377 X |
| 2,473,363 | 6/1949 | Cook et al. | 24/115 K X |
| 2,607,436 | 8/1952 | Martin | 55/376 |
| 3,410,061 | 11/1968 | Knight | 55/381 X |
| 3,426,510 | 2/1969 | Schaaf | 55/378 X |
| 3,429,107 | 2/1969 | Graves | 55/381 X |
| 3,871,845 | 3/1975 | Clarke et al. | 55/378 X |
| 3,991,444 | 11/1976 | Bailey | 24/16 PB |

FOREIGN PATENT DOCUMENTS

| | | | |
|---|---|---|---|
| 500290 | 6/1930 | Fed. Rep. of Germany | 55/376 |
| 704629 | 4/1941 | Fed. Rep. of Germany | 210/497 R |
| 819140 | 10/1951 | Fed. Rep. of Germany | 55/509 |
| 1585940 | 2/1970 | France | 55/378 |
| 417157 | 4/1934 | United Kingdom | 24/115 H |

Primary Examiner—Kathleen J. Prunner
Attorney, Agent, or Firm—James D. Givnan, Jr.

[57] ABSTRACT

A filter structure supporting a series of tubular filter bags for filtering a dust-laden airflow. The filter bags are subjected to a momentary reverse flow for purging collected particles from the bag walls. The filter bags are supported against pressure drops existing across the bag walls by bag shaping members affixed at spaced intervals along each filter bag. Each bag shaping member is retained in an adjustable, annular pocket formed by a cuff secured to the bag wall. This cuff is provided with a sizing means which permits contraction of the pocket to confine the shaping member therein and expansion of the pocket to permit convenient removal of the shaping member therefrom prior to laundering of the filter bag.

8 Claims, 7 Drawing Figures

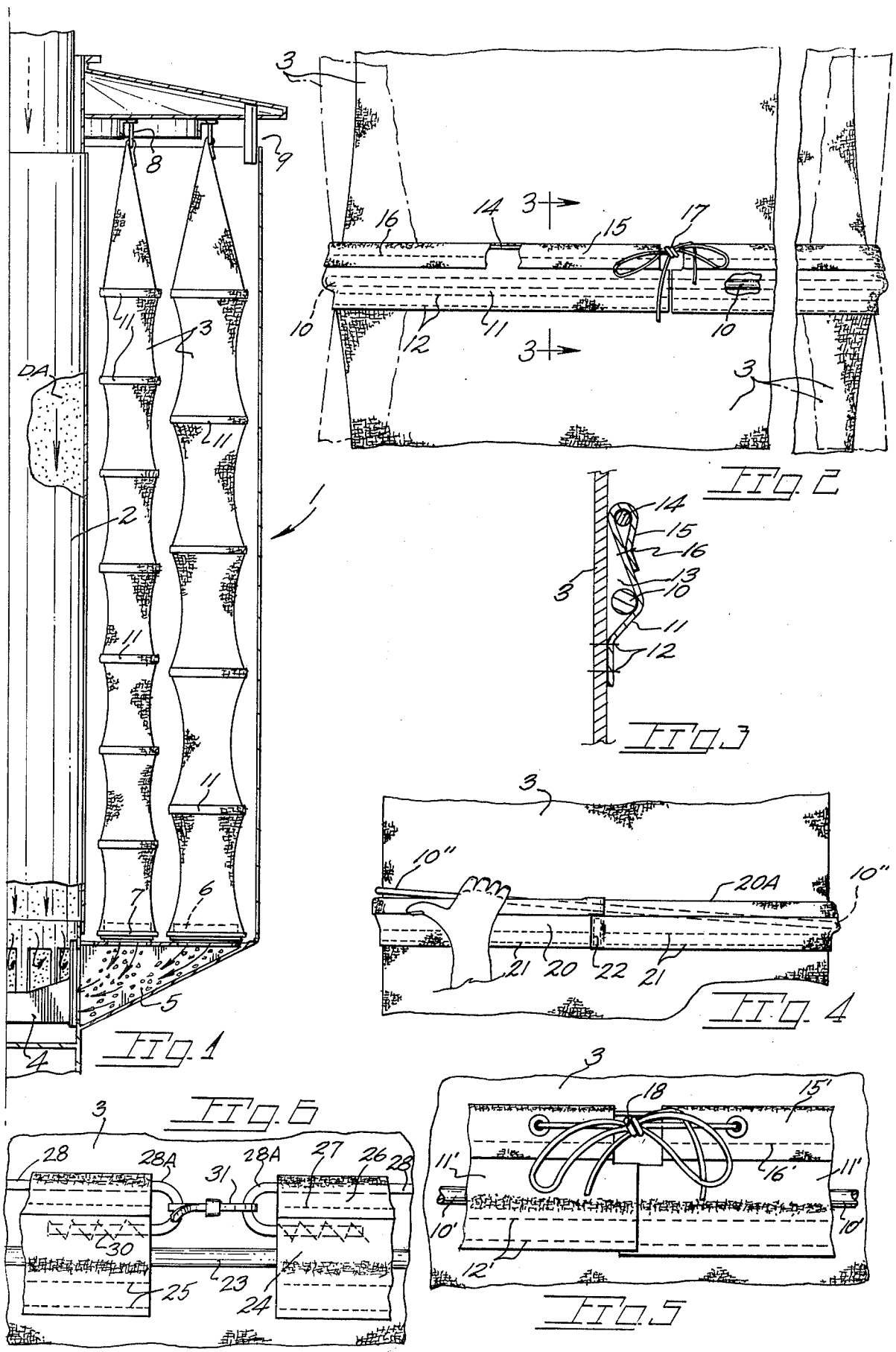

FILTER BAG WITH REMOVABLE SHAPING MEMBERS

This present application is a continuation-in-part of our copending U.S. patent application bearing the same title filed June 22, 1977 under Ser. No. 809,113 and now abandoned.

BACKGROUND OF THE INVENTION

The present invention relates to tubular filter elements of the type filtering a dust-laden airflow by separating out airborne particles during passage of the airflow through a pervious wall of the element.

Common to the filtering art are elongate, tubular filter elements, termed bags in the trade, of air pervious material through which is directed a dust-laden flow of air. Particles are separated from the airstream and collect on bag inner or outer surfaces depending on flow direction. Provision is made in state of the art industrial filters to subject the bags or a filter structure to a periodic, reverse flow of air which dislodges and removes the collected particles to purge the filter. Commonly, bag purging is automatically conducted at timed intervals.

During both normal bag operation as well as during bag purging a pressure drop exists across the bag walls resulting in some lateral displacement of the bag wall. To prevent severe distortion, particularly during bag purging, it has become a recognized practice to fixedly incorporate rigid rings at spaced intervals along a filter bag or element.

With continuing attention to the existing state of the art, after several months of bag operation it is common practice that the bag be removed from the filter baghouse for transfer to a laundering facility. During such bag cleaning the bag is subjected to agitation resulting in bag wear particularly where the bag fabric is in contact with a bag shaping ring. Premature bag wear and resultant replacement results in substantial costs to the filter operator. Undetected bag wear can result in later bag failure requiring shutdown of the filter structure.

While the prior art disclosed the use of filter bag shaping rings, no bag structure is found providing convenient installation and removal of such rings. French Pat. No. 1,585,940 mentions that the rings instead of being sewn to the bag may also be positioned at spaced intervals along a bag by suspending the rings in a wire or chain interconnected manner.

SUMMARY OF THE INVENTION

The present invention is embodied within filter bag construction wherein bag shaping members are spaced along the bag wall in a manner permitting their convenient removal and replacement.

Industrial type air filter structures typically include a series of elongate, fabric filter elements, termed bags, into or against which a dust-laden flow of air is directed prior to return of the air to the atmosphere. The bag shaping members of the present bag are supported in a removal manner within bag affixed retaining means to enable convenient removal, prior to bag cleaning, and subsequent re-attachment.

Important objectives of the present invention bag construction include the provision of a filter element or bag having shaping members removably attached thereto; the provision of filter bag construction having removable bag shaping members to permit laundering of the bag without subjecting the bag to wear or damage from rigid bag shaping members; the provision of filter bag construction providing a filter bag of extremely durable construction incurring low maintenance costs; the provision of a filter bag providing a removable bag shaping member supported within a bag attached cuff in a manner preventing abrasion between the shaping member and bag with the cuff having sizing means readily contractable and expansible for retention of the shaping member as well as convenient release of same prior to bag laundering.

BRIEF DESCRIPTION OF THE DRAWING

In the accompanying drawing:

FIG. 1 is a fragmentary elevational view of an industrial air filter of a type utilizing tubular fabric filter bags;

FIG. 2 is an enlarged, side elevational view of a bag segment of a bag made in accordance with the present invention;

FIG. 3 is a vertical, sectional view taken along line 3—3 of FIG. 2 on an enlarged scale;

FIG. 4 is a view similar to FIG. 2 but on a somewhat reduced scale showing a modified retainer arrangement for a bag shaping member;

FIG. 5 is an enlarged fragmentary view of bag construction with still another modified retainer arrangement for securing the bag shaping member in place;

FIG. 6 is a view similar to FIG. 5 showing still another modification; and

DETAILED DESCRIPTION OF THE PREFERRED EMBODIMENTS

Figure 7:
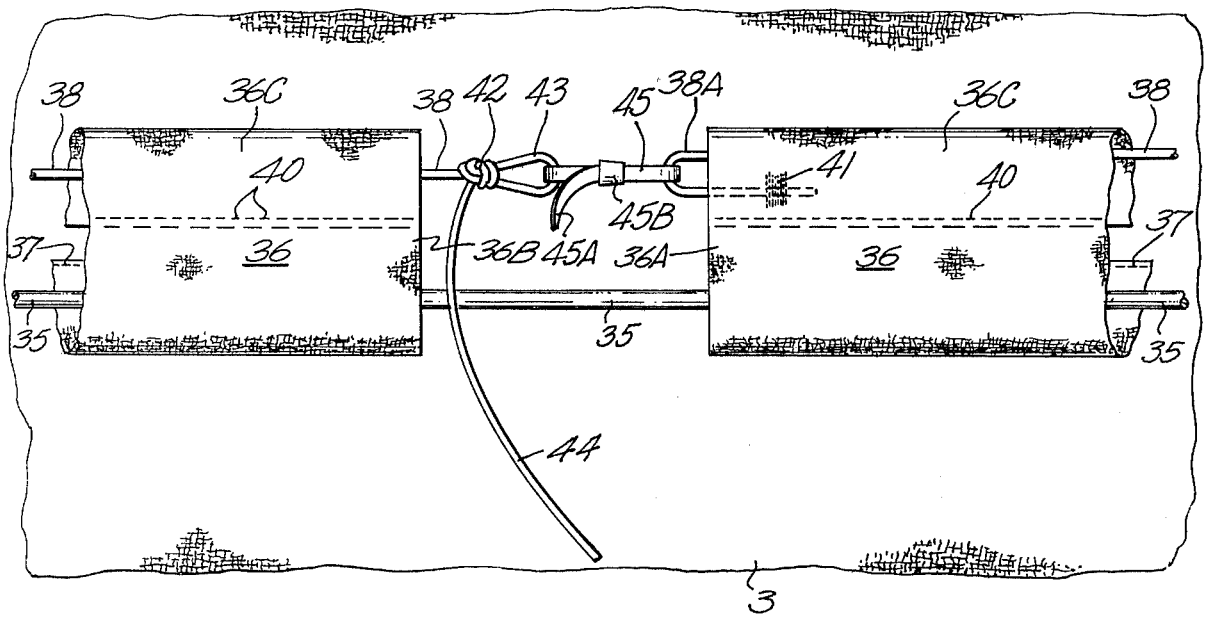
FIG. 7 is an enlarged fragmentary view of a filter bag wall with still another modified retainer arrangement.

With continuing reference to the accompanying drawings wherein applied reference numerals indicate parts similarly identified in the following specification, the reference numeral 1 indicates generally an industrial type filter structure currently in use with fragments broken away to disclose an inlet structure 2 for a dust-laden airflow at DA resulting from one type or another industrial operation.

The dust-laden airflow is directed toward an array of filter elements or bags 3 each having a tubular main body wall with filtering occurring during air passage through the air permeable bag walls. Operation of the filter structure over a period of time results in the caked deposit of particles on the bag interior surfaces which particles must be removed at intervals to restore a desired pressure drop across the bag walls for proper filter operation. In the filter structure shown, the bags 3 receive a dust-laden airflow at their lower ends with filtering accomplished during outward passage of the air through the bag walls which are returns to the atmosphere via annular filter opening 9.

For particle removal during a filter purging mode, a reverse flow of ambient air through the bag walls is induced by a rotatable sweep or purge duct at 4 in communication at its unseen end with a below atmospheric source of negative pressure such as the intake of a blower. The purge duct 4 sweeps into successive communication with annularly disposed chambers at 5 each in upward communication with a filter bag 3. In FIG. 1, a pair of filter bags is shown being subjected to a reverse purge flow by sweep 4.

The foregoing is a brief description of a filter structure disclosed in U.S. Pat. No. 3,871,845 owned in common by the owner of the present invention. The foregoing description is intended to be of one filter structure within which the present bag invention may be utilized. It is to be understood that the present filter bag invention is in no way limited to use with any specific filter structure but rather may be used in conjunction with different air filters.

With attention now to filter bag construction, the tubular shaped bags are of a porous fabric, the porosity of which will vary to suit various filtering requirements. One commonly used bag material is woven polypropylene. Other bag material may be of felt construction. The bag or tubular element 3 is open at one end and is secured thereat in place about a collar 6 by a removable band 7. The opposite bag end is shown as being secured in place by an angular bracket 8 insertable through a folded and stitched portion of the bag end. Obviously various other arrangements may be utilized for securing the bag ends to permit bag removal for periodic laundering.

The present invention is embodied in bag construction having bag shaping members 10 such as metal rings located at intervals along a bag to maintain the bag in generally tubular configuration against pressure drops occurring across the bag wall. During filter operation, the bag wall is subjected to displacement in opposite directions during filtering and purge modes of filter operation.

Each bag shaping member 10 is supported in place by retainer means which, as shown in FIG. 2, includes a bag attached pliable cuff 11 secured in place on the bag by stitching 12. Cuff 11 is of somewhat greater diameter than the bag wall having an edge portion stitched at 12 with a remaining cuff portion forming an annular pocket 13 adjustable for the reception and release of shaping member 10. Sizing means are provided at 14 to permit adjustment of the effective size of the fabric cuff 11, to confine bag shaping member 10 in pocket 13 or, alternatively, permit removal of member 10 prior to bag laundering.

The sizing means provided at 14 is in the form of a drawstring which extends through a folded back remaining cuff portion 15 which is stitched at 16 to define a fabric tube. The drawstring is tied at 17.

In FIG. 5, a somewhat modified arrangement is shown wherein a knotted tie at 18 passes through eyelets and serves as sizing means to contract or permit expansion of a cuff portion at 15'. Other cuff components, similar to those described above, are identified by prime reference numerals.

In FIG. 4, a still further variation of the present invention is disclosed, which variation dispenses with the cuff adjustment means earlier described and relies on the cuff perimeter size to retain bag shaping member 10" in place. The cuff 20 is attached to the bag as by stitching 21 with the cuff ends joined by stitching 22. A bag shaping member 10" is insertable into the cuff as shown by progressively forcing said shaping member into place within an annular pocket defined by said cuff and the adjacent bag wall. The inherent elasticity of the cuff fabric, though slight, is adequate to permit member acceptance with said member being retained by the cuff edge at 20A, which has an effective diameter slightly less than the pocket defining portion of the cuff.

In FIG. 6, wherein still another form of the present invention is shown, a bag shaping member 23 is removably confined within retainer means including a fabric cuff 24 stitched along an edge portion to a tubular bag 3 by stitching 25 and with spaced apart cuff ends. A folded portion 26 of a remaining cuff portion is stitched at 27 and receives sizing means shown as a cord 28 the ends 28A of which are reversed to provide spaced apart looped segments secured by stitching 30 to the cuff. A convenient method of sizing the adjustable remaining edge portion 26 of the cuff is by use of tie means 31 which may be of the type widely used in the tying of insulated electrical cables or wires into bundles and which includes a positive, automatic locking pawl to retain the tie in a desired loop size. Tie 31 is inserted through the looped segments 28A of cord 28 and thereafter drawn toward a reduced size to contract cuff 24 to a size enabling manual removal of shaping member 23 at bag laundering intervals. Such ties are termed "cable ties" and are manufactured and sold by the Panduit Corporation of Tinley Park, Illinois.

In FIG. 7 a still further modifed form of the invention is disclosed wherein a bag wall 3 is again shaped by a member 35 which may be a metal ring somewhat larger in diameter than the bag diameter. Retainer means for member 35 comprises a fabric cuff 36 which, along with other vertically spaced apart cuffs, is stitched at 37 adjacent one of its edges to the bag wall 3. Cuff ends at 36A and 36B terminate in spaced relationship to one another to facilitate sizing of the adjustable remaining cuff portion at 36C for retention or removal of said shaping member. Said adjustable remaining cuff portion has a folded and stitched portion with a line of stitching at 40 to form a fabric tube therein separate from the bag wall. Cuff sizing means comprises a flexible member 38 which may be a cord stitched at one of its ends at 41 to folded over cuff portion 36C so as to form a looped segment 38A while the remaining end segment of flexible member 38 is knotted at 42 to form a second looped segment 43 with a pull segment 44 of the continuous member providing an easily grasped pull at least partially exterior of the cuff for tensioning by a worker during cuff sizing.

In sizing of a cuff to retain a bag shaping member 35 in place, tie means 45 is inserted through looped segments 38A and 43 with the tie end 45A thereafter being passed through an enlarged portion 45B of the tie which embodies a pawl (not shown) which admits inserted end 45A of the tie but thereafter prevents retraction of same. The tie is of the same type earlier described and is widely used in the bundling of insulated electrical wires. Obviously, other tie means could be utilized such as a length of cord.

In the last described form of the invention the shaping member 35 is initially placed within the cuff whereafter the cuff is folded upwardly to substantially enclose the shaping member. The pull portion 44 of the cord is manually pulled to locate loop segment 43 in close proximity to looped segment 38A and held there during insertion of tie means 45. The effective diameter of the adjustable cuff portion is thereby reduced or sized to assure retention of the shaping member 35 during both inward and outward displacement of bag wall 3 during purging and normal operating conditions of the filter. For purposes of time savings in removal of member 35, the plastic tie means 45 may be snipped with wire cutters to conveniently release the cuff from its "closed" or contracted configuration shown in FIG. 7 to permit rapid cuff expansion and downwardly folding of same.

While we have shown but a few embodiments of the invention it will be apparent to those skilled in the art that the invention may be embodied still otherwise without departing from the spirit and scope of the invention claimed.

Having thus described the invention what is desired to be secured under a Letters Patent is:

1. In a tubular shaped filter bag having an air pervious main body of cylindrical configuration and supported at its ends within an air sructure, the improvement comprising, bag shaping members located in a spaced apart manner along the bag, and retainer means associated with each of said members and normally confining one of said bag shaping members in place about the bag body, each of said retainer means including a fabric cuff secured to the bag body and permitting temporary removal of a bag shaping member prior to removal of the filter bag for laundering purposes, said cuff being stitched adjacent one edge thereof to the bag body with a remaining adjustable cuff portion adapted to support a bag shaping member in a removable manner, cuff sizing means carried by and acting on said remaining cuff portion to enable contractive adjustment of same for retention of the bag shaping member and alternatively expansive adjustment of the cuff for removal of said shaping member.

2. The invention claimed in claim 1 wherein said remaining adjustable cuff portion of each of said retainer means has a folded and stitched portion, each of said cuff sizing means being carried by said folded and stitched portion.

3. The invention claimed in claim 2 wherein each of said cuff sizing means is a drawstring extending interiorly of said folded and stitched portion and with exposed ends for knotting.

4. The invention claimed in claim 2 wherein each of said cuff sizing means is an elongated flexible member secured at its ends to said cuff so as to form spaced apart looped segments, removable tie means interconnecting said looped segments in a tensioned manner to hold the cuff in a contracted state.

5. The invention claimed in claim 4 wherein each of said tie means is of the automatically locking type.

6. The invention claimed in claim 2 wherein each of said cuff sizing means is an elongated flexible member secured at one of its ends to said cuff so as to form a looped segment, said flexible member having a looped segment formed therein adjacent its opposite end, removable tie means interconnecting said looped segments in a tensioned manner for contraction of the cuff and retention of the bag shaping member.

7. The invention claimed in claim 6 wherein each of said tie means is of the automatically locking type.

8. The invention claimed in claim 6 wherein each of said flexible members additionally includes a pull segment at all times at least partially exposed for grasping and tensioning of the flexible member during application of the tie means.

* * * * *